March 31, 1970 W. H. SCHULER 3,503,412
TWO TANK BULK FLUID SYSTEM
Filed Feb. 26, 1968 2 Sheets-Sheet 1
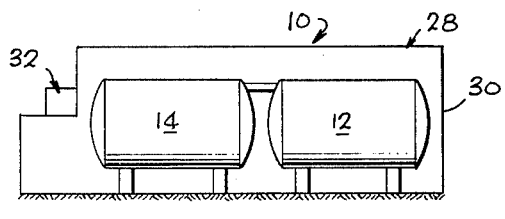
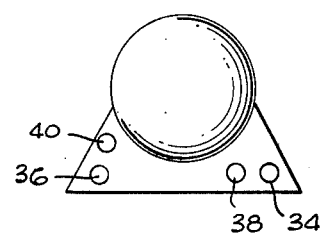
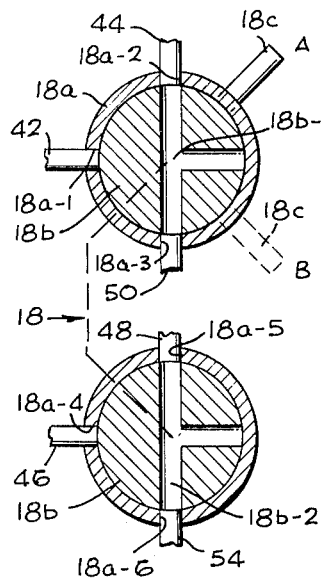
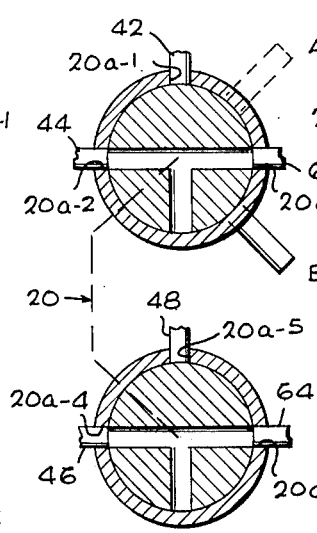
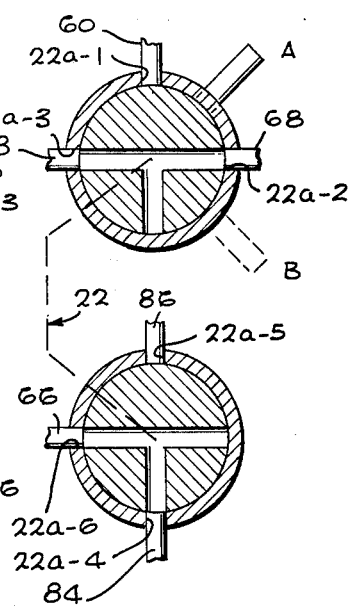
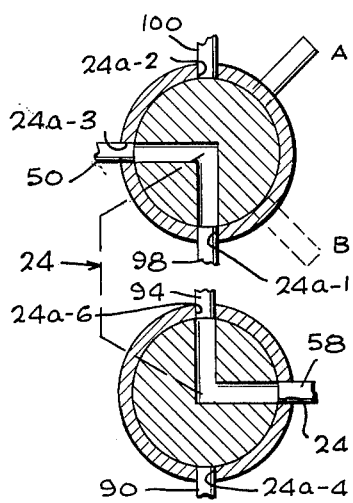
WILLIAM H. SCHULER
INVENTOR
BY
Beehler & Arant
ATTORNEYS

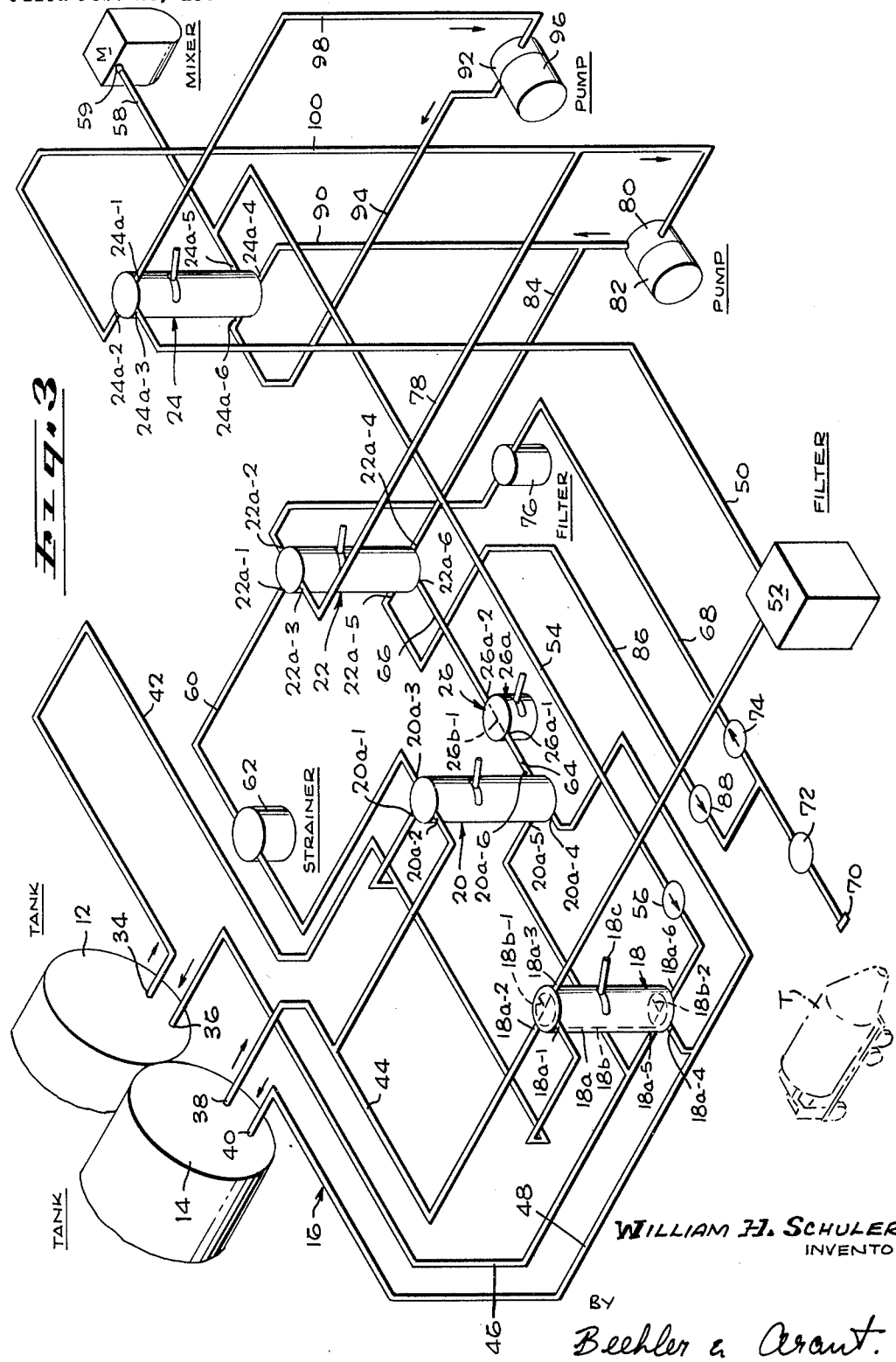

United States Patent Office 3,503,412
Patented Mar. 31, 1970

3,503,412
TWO TANK BULK FLUID SYSTEM
William H. Schuler, 8502 S. Hoover Ave.,
Los Angeles, Calif. 90044
Filed Feb. 26, 1968, Ser. No. 708,290
Int. Cl. F17d 1/14; A21b 7/00
U.S. Cl. 137—265
8 Claims

ABSTRACT OF THE DISCLOSURE

The invention is embodied in a multiple tank, multiple valve system for the handling of liquid shortening which serves a variety of needs and economizes in the number of pumps by making use of valves with multiple functions. There are two storage tanks which can be called upon in the alternative to supply a mixer. Fluid can be changed from one tank to the other. There is also a connection to the system which can be attached to a tank truck so that the tank truck can be connected to either of the storage tanks for either filling or emptying the storage tanks, or can be connected to the mixer. The entire system is a self-contained system of piping completely sanitary for the handling of edible fluid oils in that nothing need be touched by hand other than the valve handles.

---

The following modes of fluid transfer are anticipated:

(1) Dispensing fluid from a selected tank to an external device for utilizing the fluid and automatically returning any surplus fluid to the selected tank.

(2) Transferring fluid from an external fluid supply, such as a tank truck, to a selected tank.

(3) Transferring fluid from a selected tank to an external fluid receiver, such as a tank truck.

(4) Transferring fluid from one tank to another.

(5) Selectively transferring fluid according to any one of the modes 1 through 4 above by means of the pumping effort of either of two fluid pumps.

As will appear from the ensuing description, the fluid handling system of the invention is susceptible of a variety of applications and may be employed to handle a variety of fluids, both liquids and gases. However, the fluid handling system of the invention is designed primarily for use in the commercial baking trade to handle the various animal and vegetable fats which are employed for shortening in commercial baking operations. For this reason, the invention will be disclosed herein in connection with this particular application thereof.

Commercial bakeries employ a variety of animal and vegetable fats as shortening in their baking operations. Among the fats used for this purpose are lard, hydrogenated fats, tallow, soya oil, cottonseed oil, peanut oil, and the like. These shortenings are commonly stored in large tanks from which a shortening may be dispensed as required to a mixer, wherein the shortening is blended with other baking ingredients. Proper mixing of the shortening with such other ingredients requires admission of the shortening to the mixer at a predetermined optimum blending temperature. This optimum blending temperature of most commercial shortenings is well above normal ambient temperature, so that it is necessary to heat the shortenings prior to their admission to the mixers. Most bakeries employ bulk storage heaters for this purpose. A typical bulk storage heater comprises a pair of storage tanks contained within a housing and a heating system in the housing for continuously recirculating hot air all over the tanks to maintain the shortening therein at its particular optimum blending temperature.

Handling of each shortening at a commercial bakery involves several different modes of transfer of the shortening. Thus, shortening is commonly transported from a source of supply to a bakery in a large tank truck from which the shortening is pumped into the bulk storage tanks at the bakery. Thereafter, in the course of baking operations, the shortening is dispensed from the storage tanks to the mixers, as required. Occasionally, it is necessary to transfer a shortening from one of its storage tanks to the other and to empty one or both tanks by pumping the shortening back into a tank truck. The fluid handling system of this invention is uniquely designed to permit these various modes of transfer of shortening in commercial bakeries. As noted earlier, however, the invention is not limited to this particular application and may be used in any multiple tank fluid storage system requiring the selective transfer of fluid from a fluid supply to a selected tank of the system, transfer of the fluid from a selected tank back to the supply, dispensing of the fluid from a selected tank to a fluid utilization device, and transfer of the fluid from one tank to another.

It is, accordingly, a general object of this invention to provide an improved fluid handling system of the character described.

A more specific object of the invention is to provide a handling system for fluids contained in multiple bulk storage tanks which permits selective transfer of the fluid from a fluid supply to a selected tank of the system, from a selected tank, back to the fluid supply, from a selected tank to a fluid utilization device and from one tank to another.

Another object of the invention is to provide a fluid handling system of the character described wherein during the transfer of fluid from a selected tank to a fluid utilization device, the surplus fluid is automatically returned to the selected tank.

Yet another object of the invention is to provide a fluid handling system of the character described which is uniquely adapted for handling shortening in commercial bakeries.

Other objects, advantages, and features of the invention will become readily apparent as the description proceeds.

With these and other objects in view, the invention consists in the construction, arrangement, and combination of the various parts of the device, whereby the objects contemplated are attained as hereinafter set forth, pointed out in the appended claims and illustrated in the accompanying drawings.

In the drawings:

FIGURE 1 is a vertical section thorugh a bulk storage heater of the type employed in commercial bakeries for storing and dispensing shortening at the proper blending temperature.

FIGURE 2 is an end view of the bulk storage heater in FIGURE 1.

FIGURE 3 diagrammatically illustrates a fluid handling system according to the invention including the storage tanks illustrated in FIGURE 1: and FIGURES 4 through 7 are semi-diagrammatic transverse sections through certain flow control valves embodied in the fluid handling system of FIGURE 3.

The fluid handling system 10 of the invention illustrated in these drawings comprises a pair of fluid storage tanks 12 and 14 and a fluid transfer system 16 connected to the tanks. In line with the earlier discussion, the fluid handling system 10 will be disclosed herein in connection with its primary application in a commercial bakery for handling shortening of the type employed in commercial baking operations. As noted in this earlier discussion, shortening is commonly delivered to a commercial bakery in a large tank truck from which the shortening is pumped into the storage tanks at the bakery. Occasionally, shortening is pumped from the storage tanks to a tank truck in order to drain the storage tanks. In FIGURE 3, a tank truck T of this type is illustrated on greatly reduced scale. Over a period of time, the shortening is dispensed from the storage tanks to mixers in which the shortening is blended with other baking ingredients. In FIGURE 3, reference character M designates such a mixer. For convenience in the ensuing description, the shortening which the illustrated fluid handling system 10 is intended to contain will be referred to simply as a fluid.

Included in the fluid transfer system 16 are a number of flow control valves 18, 20, 22, 24, and 26. As will appear from the later description, these valves are adapted to be selectively pre-set to condition the transfer system for any one of the following modes of fluid transfer:

(1) Dispensing fluid from either storage tank 12 or 14 to the mixer M and automatically returning the surplus fluid to the tank from which the fluid is being dispensed.

(2) Pumping fluid from the tank truck T to either storage tank 12 or 14.

(3) Pumping fluid from either storage tank 12 or 14 to the tank truck T.

(4) Pumping fluid from either storage tank 12 or 14 to the other storage tank.

(5) Pumping fluid from a selected storage tank 12 or 14 to the mixer M by means of either of two pumps, hereinafter referred to as a large pump and a small pump, respectively.

As will appear from the ensuing description, the valve 18 of the fluid transfer system 16 selects the storage tank 12 or 14 from which the fluid is dispensed to the mixer M, and, for this reason, valve 18 is hereinafter referred to in places as a tank selector valve. Valve 20 selects the storage tank which receives fluid and/or the storage tank from which fluid is withdrawn when transferring fluid from one tank to the other and between a selected storage tank and the tank truck T. For this reason, valve 20 is also hereinafter referred to, in places, as a tank selector valve. Valve 22 selects the direction of fluid flow when transferring fluid between the tank truck T and the storage tanks; that is to say, valve 22 is set in one position to condition the fluid transfer system for filling the storage tanks from the tank truck and in another position for draining the storage tanks to the tank truck. Accordingly, valve 22 is hereinafter referred to, in places, as a fill-drain valve. Valve 24 selects the pump, i.e., the large pump or the small pump, to be used when dispensing fluid from the storage tanks 12, 14 to the mixer M. For this reason, valve 24 is hereinafter referred to as a pump selector valve. Finally, valve 26 serves as and will hereinafter be referred to as a shut-off valve.

As noted earlier, the shortening used by commercial bakeries must be heated to maintain the shortening at the proper blending temperature. To this end, the shortening storage tanks of commercial bakeries are contained within bulk storage heaters which are effective to maintain the shortening in the tanks at such proper blending temperature. FIGURES 1 and 2 of the drawings illustrate a bulk storage heater 28 of this type including the storage tanks 12 and 14 of the present fluid handling system 10. Heater 28 comprises a housing 30 enclosing the storage tanks 12 and 14 and containing a heating system, generally designated by the reference numeral 32 for recirculating hot air over the tanks. The heater housing 30 has external suction and fill connections 34 and 36, respectively, communicating to the tank 12 and external suction and fill connections 38 and 40, respectively, communicating to the tank 14.

Referring now in more detail to the fluid transfer system 16, the flow control valves 18, 20, 22, and 24 embodied in the system are identical. Accordingly, only one of these valves, namely, the tank selector valve 18 will be described in detail since it is apparent that the description of valve 18 will apply to all of the remaining valves 20, 22, and 24. Valve 18 comprises a body 18a containing a valve rotor 18b. At one end of the valve body 18a are three ports 18a–1, 18a–2, and 18a–3. At the opposite end of the valve body are three ports 18a–4, 18a–5, and 18a–6. Extending through one end of the valve rotor are passages 18b–1. Extending through the opposite end of the rotor are passages 18b–2. Extending from the rotor is a handle 18c for turning the rotor between the two positions designated as A and B in the drawings. When the valve rotor occupies position A, the upper rotor passages 18b–1 communicate the valve ports 18a–2 and 18a–3, and the lower rotor passages 18b–2 communicate the valve ports 18a–5 and 18a–6.

In the drawings, the elements of the remaining valves 20, 22, and 24 are identified by the same numbering system employed in connection with valve 18, using as the basic numeral of the numbering system, in each case, the numeral applied to the respective valve. Valve 26 is a simple shut-off valve including a valve body 26a and a valve rotor 26b. The valve body has ports 26a–1 and 26a–2. The valve rotor has a passage 26b–1 which communicates the ports 26a–1 and 26a–2 when the rotor occupies its open position illustrated. When the rotor is turned to its closed position, the valve ports are blocked.

Included in the fluid transfer system 16 are pipe lines 42 and 44 which connect at one end to the tank suction connections 34 and 38, respectively, on the bulk storage heater 28. These lines are hereinafter referred to as suction lines. Also included in the fluid transfer system are pipe lines 46 and 48 which connect to one end to the fill connections 36 and 40, respectively, of the bulk storage heater. These latter lines are hereinafter referred to as fill lines. Suction lines 42 and 44 connect to the ports 18a–1 and 18a–2, respectively, of the tank selector valve 18 and to the ports 20a–1 and 20a–2, respectively, of the tank selector valve 20.

Leading from the remaining upper port 18a–3 of the tank selector valve 18 is a pipe line 50 which connects to the upper port 24a–3 of the pump selector valve 24. Line 50 contains a filter 52. As will appear from the ensuing description, when fluid is dispensed from a selected storage tank 12 or 14 to the mixer M, the fluid flows to the mixer through the line 50 and the pump selector valve 24. Leading from the remaining lower port 18a–6 of the tank selector valve 18 is a pipe line 54 containing a check valve 56. Line 54 connects to a delivery line 58 extending from the lower port 24a–5 of the pump selector valve 24 to the mixer M. Check valve 56 permits flow through the line 54 only in the direction indicated by the arrow in FIGURE 3. When fluid is transferred from a selected storage tank 12 or 14 to the mixer M the surplus fluid is returned to the selected tank through the line 54. For this reason, line 54 is hereinafter referred to, in places, as a surplus return line.

Leading from the remaining upper port 20a–3 of the tank selector valve 20 is a pipe line 60 which connects to the upper port 22a–1 of the free drain valve 22. Line 60 contains a strainer 62. A pipe line 64 extends from the remaining lower port 20a–6 of the tank transfer valve 20 to the port 26a–1 of the shut-off valve 26. Extending from the remaining port 26a–2 of the shut-off valve to the lower port 22a–6 of the valve 22 is a pipe line 66.

Extending from the upper port 22a–2 of the valve 22 is a pipe line 68 which terminates at its other end in a tank truck connection 70. Line 68 contains a tank truck valve 72, a check valve 74, and a filter 76. Tank truck valve 72 is a simple shut-off valve. Check valve 74 permits flow through the line 68 only in the direction indicated by the arrow in FIGURE 3. Extending from the remaining upper port 22a–3 of the fill drain valve 22 is a pipe line 78 which connects to the suction side of a pump 80. Pump 80 is driven by a motor 82. A pipe line 84 connects the discharge side of the pump 80 to the lower port 22a–4 of the valve 22. The remaining lower port 22a–5 of the valve 22 is connected to one end of a return pipe line 86 containing a check valve 88. The opposite end of the line 86 connects to the line 68 at a position between the tank truck valve 72 and the check valve 74. Check valve 88 permits flow through the line 86 only in the direction indicated by the arrow in FIGURE 3.

The discharge side of the pump 80 is connected via a pipe line 90 to the lower port 24a-4 of the pump selector valve 24. The remaining lower port 24a-6 of the pump selector valve is connected to the discharge side of a second pump 92 through a pipe line 94. Pump 92 is driven by a motor 96. Extending from the upper port 24a-1 of the pump selector valve 24 to the suction side of the pump 92 is pipe line 98. A pipe line 100 connects the remaining upper port 24a-2 of the valve 24 to the suction side of the pump 80.

As noted earlier, the two pumps embodied in the fluid transfer system 16 are referred to, respectively, as a large pump, and a small pump. Pump 80 is the large pump and pump 92 is the small pump. As will appear from the ensuing description, the small pump 92 is normally used to dispense fluid from a selected storage tank 12 or 14 to the mixer M and the large pump 80 is employed in all of the other modes of fluid transfer of the fluid transfer system 16. Under emergency conditions, however, involving failure of the small pump 92, for example, the large pump 80 may be employed to transfer fluid from the storage tanks to the mixer.

The operation of the present fluid handling system 10 will now be described. In this description, reference is made to the several modes of fluid transfer referred to earlier, for which the system may be conditioned by presetting of the flow control valves 18, 20, 22, 24, and 26.

Mode 1.—Dispensing fluid from either storage tank to mixer

In this mode of fluid transfer, valve 18 selects the storage tank 12 or 14 from which the fluid is to be pumped and valve 24 selects the pump 80 or 92 to be used for pumping. Assume first that the valve 18 is set in position A and the valve 24 is set in position A. Under these conditions, fluid flows from tank 14, through suction line 44, the upper end of valve 18, line 50, the upper end of valve 24, and line 98 to the suction side of the small pump 92. The fluid emerging from the pump discharge flows through line 94 the lower end of valve 24, and line 58 to the mixer M. If the valve 18 is set in position B, fluid from the tank 12 flows through suction line 42 to the upper end of the latter valve and then through the remainder of the flow path traced above to the mixer.

Assume now that the valve 24 is set in the B position. In this case, fluid from the storage tank 12 or 14 selected by the current setting of the valve 18, flows to the upper end of valve 24 through line 50, as before. Now, however, the fluid emerges from the latter valve through line 100 and flows therethrough to the suction side of the large pump 80. The fluid emerging from the latter pump flows through line 90, the lower end of valve 24, and line 58 to mixer M. At this time, the shut-off valve 26 and the tank truck valve 72 are closed so that no flow occurs through line 84.

While a single mixer M has been illustrated, the present fluid handling system will generally supply a number of mixers. In either case, the demand for the fluid delivered to the mixer or mixers will fluctuate as the mixer valve or valves 59 are opened and closed. Whenever the rate at which the fluid is supplied to the mixers exceeds the demand for the fluid, a back pressure is created in the system which reacts on the relief valve 56 in the surplus return line 54. Valve 56 is set to open in response to this back pressure. Surplus fluid then flows from line 58, through the return line 54, and the lower end of the valve 18, to one of the fill lines 46 or 48, depending upon current setting of the latter valve. It is significant to note that valve 18 directs the returning flow of surplus fluid to the same tank from which the fluid was initially pumped. At this point, therefore, it is apparent that in the mode of fluid transfer under discussion, the valve 18 and the valve 24 may be set to condition the fluid transfer system 16 for pumping fluid from either storage tank 12 or 14 to the mixer M by means of either of the pumps 80 or 92. During normal operation of the system, the small pump 92 is used for this purpose. In the case of emergency, involving failure of the small pump, for example, the large pump 80 may be employed.

Mode 2.—Pumping fluid from a tank truck to either storage tank

In this mode of material transfer, valve 20 selects the storage tank 12 or 14 to which the material is pumped. Valves 22 and 24 are set in their A positions. The shut-off valve 26 and the tank truck valve 72 are opened. The tank of a tank truck T is connected to the pipe line 68.

Under these conditions, fluid flows from the truck T through the line 68, the upper end of valve 22, and the line 78 to the suction side of the large pump 80.

Having described the invention, what is claimed as new in support of Letters Patent is:

1. A fluid handling system comprising:
    first and second fluid storage tanks and
    a fluid transfer system including first and second suction lines connected to said first and second tanks, respectively, first and second fill lines connected to said first and second tanks, respectively, a delivery line for connection to an external fluid receiver, a return line connected to said delivery line, valve means for selectively connecting either suction line to said return line and connecting said delivery line to the fill line to the corresponding tank, a relief valve in said return line which unseats in response to predetermined fluid pressure in said return line, and means for pumping fluid from either tank to said external receiver.

2. A fluid handling system according to claim 1 wherein:
    said valve means comprises a first valve means for selectively connecting either suction line to said return line and second valve means for selectively connecting said delivery to either fill line.

3. A fluid handling system according to claim 1, wherein:
    said valve means comprises a first valve means for selectively connecting either suction line to said return line, second valve means for selectively connecting said delivery line to either fill line, and means operatively connecting said first and second valve means for operation thereof in unison to connect the suction line for either storage tank to said return line and simultaneously connect said delivery line to the fill line for the same tank.

4. A fluid handling system according to claim 1 wherein there is a fluid transfer line, a first valve means for selectively connecting either suction line to said transfer line, first and second pumps, a second valve means for selectively connecting said transfer line to the suction side of either pump, a third valve means for selectively connecting the discharge side of either pump to said overflow return line, and a fourth valve means for selectively connecting said overflow return line to either fill line.

5. A fluid handling system according to claim 4 including:
    means operatively connecting said first and fourth valve means for operation thereof in unison to connect either suction line to said transfer line and simultaneously connect said return line to the fill line for the corresponding tank, and means operatively connecting said second and third valve means for operation thereof in unison to selectively connect said transfer line to the inlet of either pump and connect the outlet of the same pump to said overflow return line.

6. In a fluid handling system according to claim 1 wherein there is a fluid supply, a fluid transfer line for connection to said fluid supply, first and second pumps, first valve means for selectively connecting said transfer line to the inlet of either pump, second valve means for selectively connecting said overflow return line to the outlet of either pump, and means for simultaneously operating said first and second valve means to selectively connect said transfer line to the inlet of either pump and simultaneously connect said overflow return line to the outlet of the corresponding pump.

7. A fluid handling system according to claim 1 including a suction line and a fill line connected to said tank and wherein one of the tanks is a tank vehicle, a fluid transfer line for connection to said tank vehicle, a pump, first valve means for selectively connecting the inlet of said pump to said suction line and said transfer line, second valve means for selectively connecting the outlet of said pump to said fill line and said transfer line, and means operatively connecting said valve means for operation thereof in unison to simultaneously connect said suction line to the inlet of said pump and said transfer line to the outlet of said pump, and simultaneously connect said transfer line to the inlet of said pump and said fill line to the outlet of said pump.

8. A fluid handling system, comprising:
first and second fluid storage tanks, and
a fluid transfer system including first and second suction lines connected to said first and second tanks, respectively, first and second fill lines connected to said first and second tanks, respectively, a first fluid transfer line, a first valve for selectively connecting either suction line to said transfer line, first and second pumps, a second valve for selectively connecting said transfer line to the inlet of either pump, a delivery line for connection to a fluid receiver, a third valve for selectively connecting the outlet of either pump to said delivery line, a surplus return line connected to said delivery line, a fourth valve for selectively connecting said fill lines to said return line, a relief valve in said return line which unseats in response to a predetermined fluid pressure in said delivery line, a second fluid transfer line, a fifth valve for selectively connecting said suction lines to said second fluid transfer line, a third fluid transfer line adapted for connection to a tank vehicle, a sixth valve for selectively connecting said second and third fluid transfer lines to the inlet of one pump, a fourth fluid transfer line connected to said third fluid transfer line, a fifth fluid transfer line, a seventh valve for selectively connecting the outlet of said one pump either to said fifth fluid transfer line alone or to both said fourth and fifth fluid transfer lines simultaneously, an eighth valve for selectively connecting said fill lines to said fifth fluid transfer line, a shut-off valve in said fourth fluid transfer line, and a shut-off valve in said fifth fluid transfer line, thereby to permit pumping of fluid from either storage tank to said receiver by means of either pump, pumping of fluid from said tank vehicle to either storage tank and from either storage tank to said tank vehicle, and pumping of fluid from either storage tank to the other storage tank.

References Cited

UNITED STATES PATENTS 3,169,667  2/1965  Headrick _____ 137—265 XR
3,279,522  10/1966  Norris et al. ____ 137—566 XR HENRY T. KLINKSIEK, Primary Examiner U.S. Cl. X.R.

137—566